US008750940B2

(12) United States Patent
Hijazi et al.

(10) Patent No.: US 8,750,940 B2
(45) Date of Patent: *Jun. 10, 2014

(54) SYSTEMS AND METHODS FOR MANAGING DYNAMIC CLOCK OPERATIONS DURING WIRELESS TRANSMISSIONS

(75) Inventors: Mohammad Hijazi, Austin, TX (US); Randall Juenger, Belton, TX (US); John Matthew Knadler, IV, Round Rock, TX (US); Indu Ramamurthi, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 237 days.

This patent is subject to a terminal disclaimer.

(21) Appl. No.: 13/316,045

(22) Filed: Dec. 9, 2011

(65) Prior Publication Data

US 2012/0083320 A1  Apr. 5, 2012

Related U.S. Application Data

(63) Continuation of application No. 12/425,810, filed on Apr. 17, 2009, now Pat. No. 8,099,135.

(51) Int. Cl.
*H04M 1/00* (2006.01)
*H04B 1/38* (2006.01)

(52) U.S. Cl.
USPC .................. 455/566; 455/136; 455/164.1

(58) Field of Classification Search
USPC .................... 455/566, 136, 164.1, 164.2, 118
See application file for complete search history.

(56) References Cited

U.S. PATENT DOCUMENTS

| 7,136,042 B2 | 11/2006 | Magendanz et al. .......... 345/100 |
| 7,193,621 B2 | 3/2007 | Wang ............................ 345/204 |
| 7,212,193 B2 | 5/2007 | Ueda ............................. 345/204 |
| 7,327,792 B2 | 2/2008 | Seo ......................... 375/240.27 |
| 7,576,707 B2 | 8/2009 | Nishimura ..................... 345/2.3 |
| 2006/0132652 A1* | 6/2006 | Kim .............................. 348/524 |
| 2009/0136264 A1* | 5/2009 | Kinoshita ..................... 399/221 |
| 2010/0060653 A1 | 3/2010 | Courtney, Jr. et al. ........ 345/530 |

* cited by examiner

*Primary Examiner* — Peguy Jean Pierre
(74) *Attorney, Agent, or Firm* — Baker Botts L.L.P.

(57) ABSTRACT

In accordance with embodiments of the present disclosure, an information handling system is provided. The information handling system may include a processor; a display coupled to the processor, the display comprising a pixel clock source configured to generate a pixel clock frequency; a memory device coupled to the processor, the memory device having a lookup table stored thereon; and a controller coupled to the processor and configured for: receiving frequency information associated with wireless transmissions of the information handling system; and dynamically adjusting the pixel clock frequency by selecting a frequency from the lookup table in response to a determination that the received frequency information is approximately equal to the pixel clock frequency.

9 Claims, 2 Drawing Sheets

| Frequency Bands | Group I (MHz) | Group II (MHz) | Group III (MHz) |
|---|---|---|---|
| 850 MHz | 869-878 | 878-886 | 886-894 |
| 900 MHz | 925-937 | 937-948 | 948-960 |
| 1800 MHz | 1805-1830 | 1830-1855 | 1855-1880 |
| 1900 MHz | 1930-1950 | 1950-1970 | 1970-1990 |
| 2100 MHz | 2112-2131 | 2131-2149 | 2149-2168 |

SYSTEMS AND METHODS FOR MANAGING DYNAMIC CLOCK OPERATIONS DURING WIRELESS TRANSMISSIONS

CROSS-REFERENCE TO RELATED APPLICATIONS

This application is a continuation of U.S. patent application Ser. No. 12/425,810filed on Apr. 17, 2009, Now U.S. Pat. No. 8,099,135,the contents of which is incorporated herein in its entirety by reference.

TECHNICAL FIELD

The present disclosure relates to wireless networks and more particularly to managing dynamic clock operations in a wireless network.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as, but not limited to, financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems are currently used for and/or include devices for wireless communications. For example, the information handling system may be cell phone, smart phone, a personal digital assistant (PDA), and/or another similar portable wireless device that may be used for wireless communication via, for example, a carrier. As another example, the information handling system may be a computer, laptop, notebook or other device that may include one or more wireless cards for wireless communications via any number of different wireless communication protocols, e.g., wireless LAN (WLAN), wireless WAN (WWAN), Bluetooth, Ultra Wide-Band, global positioning system (GPS), etc.

With emerging technologies, electromagnetic interference from sources such as panels, clock chips, graphics systems (e.g., graphics chip sets), and/or other sources have caused poor signal reception and connectivity problems in information handling systems.

SUMMARY

In accordance with embodiments of the present disclosure, an information handling system is provided. The information handling system may include a processor; a display coupled to the processor, the display comprising a pixel clock source configured to generate a pixel clock frequency; a memory device coupled to the processor, the memory device having a lookup table stored thereon; and a controller coupled to the processor and configured for: receiving frequency information associated with wireless transmissions of the information handling system; and dynamically adjusting the pixel clock frequency by selecting a frequency from the lookup table in response to a determination that the received frequency information is approximately equal to the pixel clock frequency.

In accordance with other embodiments of the present disclosure, an apparatus for substantially eliminating frequency interferences is provided. The apparatus may include a controller configured for: receiving frequency information associated with wireless transmissions of an information handling system; the received frequency information overlaps with a pixel clock frequency associated with a display of the information handling system; and dynamically adjusting the pixel clock frequency by selecting a frequency from the lookup table in response to the determination that the received frequency information is approximately equal to a pixel clock frequency associated with a display of the information handling system.

In certain embodiments of the present disclosure, a method for substantially eliminating frequency interferences is provided. The method may include the steps of receiving frequency information associated with wireless transmissions of an information handling system; and dynamically adjusting the pixel clock frequency by selecting a frequency from the lookup table in response to a determination that the received frequency information is approximately equal to a pixel clock frequency associated with a display of the information handling system.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figures 1, 2:
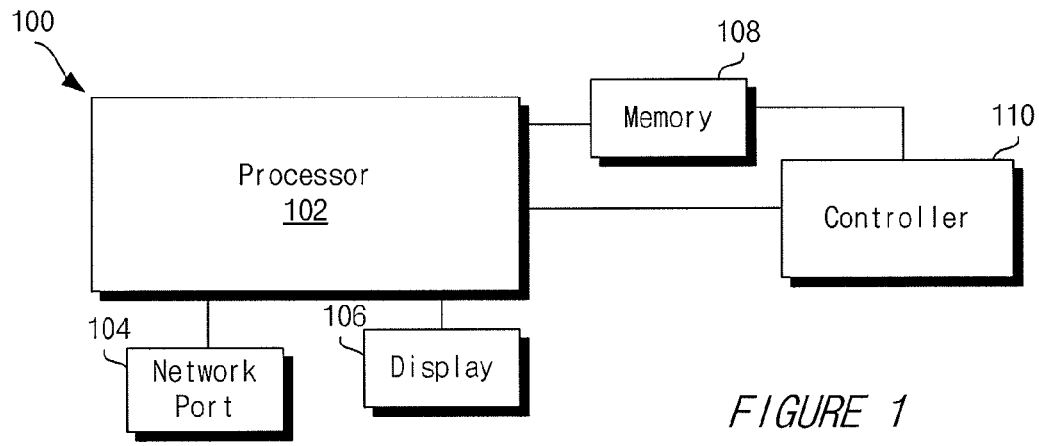
FIG. 1 illustrates a block diagram of an example information handling system for managing clock operations during wireless transmissions in accordance with certain embodiments of the present disclosure.
FIG. 2 illustrates an example lookup table for managing clock operations in an information handling system, in accordance with certain embodiments of the present disclosure.
Figure 3:
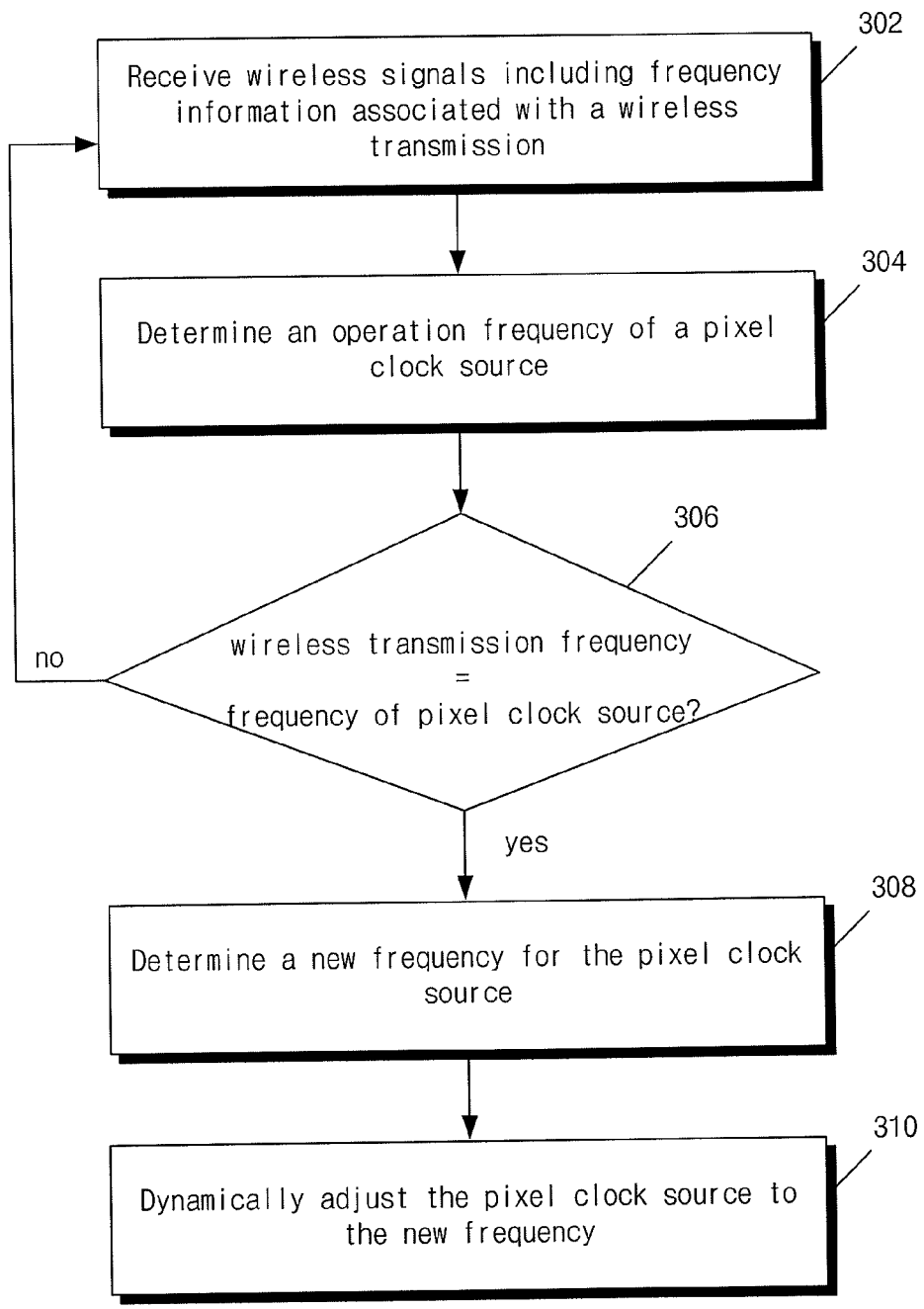
FIG. 3 illustrates a flow chart of an example method for managing clock operations during wireless transmissions, in accordance with certain embodiments of the present disclosure.

Preferred embodiments and their advantages are best understood by reference to FIGS. 1-3, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and/or a video display. The information handling system may also include one or more buses operable to transmit communications between the various hardware components.

For the purposes of this disclosure, the term "wireless transmissions" may be used to refer to all types of electromagnetic communications, which do not require a wire, cable, or other types of conduits. Examples of wireless transmissions which may be used include, but are not limited to, personal area networks (PAN) (e.g., BLUETOOTH), local area networks (LAN), wide area networks (WAN), narrowband personal communications services (PCS), broadband PCS, circuit switched cellular, cellular digital packet data (CDPD), radio frequencies, such as the 800 MHz, 900 MHz, 1.9 GHz and 2.4 GHz bands, infra-red and laser.

Examples of wireless transmissions for use in local area networks (LAN) include, but are not limited to, radio frequencies, especially the 900 MHZ and 2.4 GHz bands, for example IEEE 802.11 and BLUETOOTH, as well as infrared, and laser. Examples of wireless transmissions for use in wide area networks (WAN) include, but are not limited to, narrowband personal communications services (nPCS), personal communication services (PCS such as CDMA, TMDA, GSM) circuit switched cellular, and cellular digital packet data (CDPD), etc.

FIG. 1 illustrates a block diagram of an example information handling system 100 for managing clock operations during wireless transmissions, in accordance with embodiments of the present disclosure. As shown in FIG. 1, information handling system 100 may include a processor 102, a network port 104, a display 106, memory 108, and a controller 110.

Processor 102 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor(s) 102 may interpret and/or execute program instructions and/or process data stored in, for example, memory 108 and/or another component of information handling system 100 and may output results, graphical user interfaces (GUIs), websites, and the like via display 106 and/or over network port 104.

Network port 104 may be any suitable system, apparatus, or device operable to serve as an interface between information handling system 100 and a network. Network port 104 may enable information handling system 100 to communicate over a network using any suitable transmission protocol and/or standard, including without limitation all transmission protocols and/or standards known in the art.

Display 106 may comprise any display device suitable for creating graphic images and/or alphanumeric characters recognizable to a user, and may include, for example, a liquid crystal display (LCD) or a cathode ray tube (CRT). For example, graphics and/or text may be displayed on display 106, where the characteristics of the graphics and/or text may be generated by pixel clock signals. Within a typical LCD panel, for example, a pixel clock signal source is configured to provide a pixel clock signal of relatively low frequency with higher frequency harmonics in the form of carrier bands.

Memory 108 may be coupled to processor 102 and may comprise any system, device, or apparatus operable to retain program instructions or data for a period of time. Memory 108 may include random access memory (RAM), electrically erasable programmable read-only memory (EEPROM), a PCMCIA card, flash memory, or any suitable selection and/or array of volatile or non-volatile memory configured to retain data after power to information handling system 100 is turned off.

Controller 110 may be any system, device, and/or apparatus configured to retrieve information from, for example, a lookup table stored in a memory device (e.g., memory 108) and/or perform mathematical equations and based at least on the retrieved information or resulting calculation, controller 110 may dynamically change (e.g., shift) a clock frequency to substantially reduce and/or eliminate interference. In some embodiments, controller 110 may be a graphics card controller, an embedded controller, and/or other controllers configured to dynamically change a clock frequency (e.g., pixel clock frequency) to avoid interference.

In operation, controller 110 may reduce or substantially eliminate interference between the pixel clock frequency generated by the pixel clock source associated with display 106 and wireless transmissions via a radio circuit coupled to network port 104. The wireless transmission may often generate wireless signals of particular frequencies. In some respect, the frequencies for a wireless carrier may depend on, for example, regions of operation, such as, for example, the United States, Europe, and Japan, with each region occupying specific frequencies that differ from one another. When information handling system 100 generates wireless signals for wireless transmission, the frequency band used by the wireless carrier may interfere with the pixel clock frequencies and harmonics in display 106, thus may adversely affect wireless network connectivity or operability of display 106.

To reduce and/or substantially eliminate the interference, controller 110 may first determine the operating frequency of the wireless carrier. In one embodiment, controller 110 may receive radio information from, for example, the basic input/output system (BIOS) of information handling system 100. The BIOS may detect wireless signals (e.g., frequency information that may be indicative of the region of operation) stored in a wireless component (e.g., wireless card) coupled to network port 104. Based at least on the received operating frequency of the wireless carrier, controller 110 may access a predetermined look-up table that may be stored, for example, in memory 108 to determine a pixel clock frequency that would not interfere with the frequency associated with a wireless transmission. The lookup table may include any data structure (e.g., data array) that may store various radio frequency spectrums. Details of the lookup table are described below with respect to FIG. 2.

FIG. 2 illustrates an example lookup table 200 for managing clock operations of information handling system 100, in accordance with embodiments of the present disclosure. Lookup table 200 may include various frequency bands (e.g., 850 MHz, 900 MHz, 1800 MHz, 1900 MHz, and 2100 MHz). For each frequency band, lookup table 200 may include one or more subgroups of frequencies. For example, referring to FIG. 2, for each frequency band, the lookup table may include three subgroups of frequencies. The subgroups of frequencies may be determined in any suitable manner, e.g., predetermined dynamically and automatically by processor 102 or determined dynamically or manually by a user and subsequently stored in, for example, memory 108. In one embodiment, the various subgroups maybe divided so that multiple harmonics are included in the same frequency band. In the same or alternative embodiments, the subgroups may be divided such that the frequencies in each of the subgroups do not overlap.

Although three subgroups are shown in FIG. 2, it is noted that any number of groups (e.g., two or more groups) may be used for lookup table 200. Additionally, the ranges of frequencies shown in lookup table 200 are an example; other ranges may be used.

When information handling system 100 is configured for wireless transmission (e.g., information handling system 100 automatically syncs with a network at boot up and/or a user manually configures information handling system 100 for wireless transmission), the BIOS may detect one or more wireless signals (e.g., frequency information that may be indicative of the region of operation) stored in a wireless component (e.g., wireless card) coupled to network port 104 and provide the frequency information to controller 110. Based on the received frequency information, controller 110 may access lookup table 200 and may dynamically adjust the frequency of the pixel clock source associated with display 106 to reduce and/or substantially avoid interference.

For example, referring again to FIG. 2, if information handling system 100 has a wireless transmission frequency of about 870 MHz (Group 1 of the 850 MHz frequency band), controller 110 may dynamically adjust the pixel clock source associated with display 106 to a frequency band that differs from the wireless transmission frequency. In one embodiment, controller 110 may select a frequency of Group II or Group III for the pixel clock source. In other embodiments, controller 110 may select an entire new frequency band to operate the pixel clock source. For example, if information handling system 100 has a wireless transmission frequency of about 870 MHz (Group I of the 850 MHz frequency band), controller 110 may select a frequency from another frequency band (e.g., 900 MHz, 1800 MHz, 1900 MHz, or 2100 MHz) for the pixel clock source.

In some embodiment, controller 110 may adjust various display settings for display 106 to coincide with the newly selected frequency for the pixel clock source. Controller 110 may adjust, for example, a horizontal resolution (HR), a horizontal blanking (HB), a vertical resolution (VR), a vertical blanking (VB) and/or a refresh rate (RR) where $$\text{pixel clock (MHz)} = (HR+HB)*(VR+HB)*RR \qquad \text{Eq. 1.}$$

In one embodiment, controller 110 may adjust the horizontal and/or vertical blanking parameters to reflect the newly selected pixel clock frequency. Other display settings may also be adjusted.

In some embodiments, a "step size" of display 106 may provide some limitations to the determined pixel clock frequency. A step size is referred to as the minimum delta between frequencies that display 106 can support. Based on the limitation of the step size, a target frequency proposed to avoid interference with a wireless transmission may not be supported. To counteract this, controller 110 may take into account the maximum delta between any two frequencies that can be supported by display 106 and derive values for the lookup table (e.g., lookup table shown in FIG. 2) accordingly.

FIG. 3 illustrates a flow chart of an example method 300 for managing clock operations during wireless transmission, in accordance with certain embodiments of the present disclosure. At step 302, controller 106 may receive wireless signals that includes frequency information that is associated with a wireless transmission. In some embodiments, a BIOS executing on information handling system 100 may access stored information on a wireless component (e.g., wireless card) coupled to network port 104 and provide the frequency information to controller 110.

At step 304, controller 110 may determine a frequency of operation and/or the frequency harmonics for a pixel clock source associated with display 106. In one embodiment, controller 110 may determine the frequency of the pixel clock source by determining values of one or more display settings of display 106 (e.g., horizontal resolution, the horizontal blanking, the vertical resolution, the vertical blanking, and/or the refresh rate) and calculating the pixel clock frequency using, for example, Eq. 1.

At step 306, controller 110 may determine if the frequency information associated with the wireless transmission is substantially the same as or is a multiple of the frequency of the pixel clock source (e.g., clock frequency and/or frequency harmonic of the pixel clock source). If the wireless transmission frequency is not the same as the frequency or does not include a multiple of the frequency of the pixel clock source (e.g., the frequencies do not overlap), method 300 may return to step 302 and continue to receive wireless signals from wireless components of information handling system 100. However, if the wireless transmission frequency is substantially the same as or is a multiple of the frequency of the pixel clock source, an interference may occur, and method 300 may proceed to step 308.

At step 308, controller 110 may determine a new frequency for the pixel clock source by determining a pixel clock frequency that would differ from the frequency associated with the wireless transmission received at step 302. In one embodiment, controller 110 may access a lookup table (e.g., lookup table 200) to determine a frequency that may not interfere with the frequency associated with the wireless transmissions of information handling system 100. In some embodiments, controller 110 may select from a frequency for the pixel clock source from a group (e.g., Group I, Group II, or Group III) of a similar frequency band as the frequency of the wireless transmission. For example, referring to FIG. 2, if the frequency of the wireless transmission is about 940 MHz of the 900 MHz frequency band, controller 110 may select a frequency for the pixel clock source from Group I or Group III.

Alternatively, controller 110 may select from a frequency for the pixel clock source from another frequency band. For example, referring to FIG. 2, if the frequency of the wireless transmission is about 940 MHz of the 900 MHz frequency band, controller 110 may select a frequency for the pixel clock source from other frequency bands, e.g., 850 MHz, 1800 MHz, 1900 MHz, or 2100 MHz.

In other embodiments, controller 110 may determine a frequency for the pixel clock source by determining (e.g., calculating) a pixel clock frequency that would differ from the frequency associated with the wireless transmission received at step 302. For a given specification for display 106, controller 110 may set a clock frequency harmonic that would avoid the frequency of the wireless transmission. For example, if an operating frequency of display 106 is x, n is the harmonics of x that coincides with the wireless transmission frequency, and m is the harmonic that lands in the carrier band, controller 110 may determine an operating frequency for display 106 so that there is a reduction in or substantially no interference between the frequency of the wireless transmission and the pixel clock frequency of display 106.

At step 310, controller 110 may dynamically adjust the frequency of the pixel clock source to reduce and/or avoid interferences with the frequency of the wireless transmission by adjusting one or more display settings of display 106 to coincide with the selected frequency for the pixel clock source. In some embodiments, controller 110 may adjust the horizontal resolution, the horizontal blanking, the vertical resolution, the vertical blanking, and/or the refresh rate of display 106.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order. In addition, steps 302-310 may be repeated, independently and/or collectively, as often as desired or required by a chosen implementation.

Although the present disclosure has been described in detail, it should be understood that various changes, substitutions, and alterations may be made hereto without departing from the spirit and the scope of the invention as defined by the appended claims.

What is claimed is:

1. An information handling system, comprising:
    a processor;
    a display coupled to the processor, the display comprising a pixel clock source configured to generate a pixel clock frequency;
    a controller coupled to the processor and configured for:
        receiving frequency information associated with wireless transmissions of the information handling system; and
        dynamically adjusting the pixel clock frequency in response to a determination that the received frequency information is approximately equal to the pixel clock frequency.

2. The information handling system of claim 1, wherein dynamically adjusting the pixel clock frequency further comprising adjusting at least one of:
    a horizontal resolution of the display;
    a horizontal blanking of the display;
    a vertical resolution of the display;
    a vertical blanking of the display; and
    a refresh rate of the display.

3. The information handling system of claim 1, wherein receiving frequency information associated with wireless transmissions of the information handling system comprises receiving frequency information from a basic input/output system (BIOS) of the information handling system.

4. An apparatus for substantially eliminating frequency interferences, comprising:
    a controller configured for:
        receiving frequency information associated with wireless transmissions of an information handling system; the received frequency information overlaps with a pixel clock frequency associated with a display of the information handling system; and
        dynamically adjusting the pixel clock frequency in response to the determination that the received frequency information is approximately equal to a pixel clock frequency associated with a display of the information handling system.

5. The apparatus of claim 4, wherein dynamically adjusting the pixel clock frequency further comprising adjusting at least one of:
    a horizontal resolution of the display;
    a horizontal blanking of the display;
    a vertical resolution of the display;
    a vertical blanking of the display; and
    a refresh rate of the display.

6. The apparatus of claim 4, wherein receiving frequency information associated with wireless transmissions of the information handling system comprises receiving frequency information from a basic input/output system (BIOS) of the information handling system.

7. A method for substantially eliminating frequency interferences, comprising:
    receiving frequency information associated with wireless transmissions of an information handling system; and
    dynamically adjusting the pixel clock frequency in response to a determination that the received frequency information is approximately equal to a pixel clock frequency associated with a display of the information handling system.

8. The method of claim 7, wherein dynamically adjusting the pixel clock frequency further comprising adjusting at least one of:
    a horizontal resolution of the display;
    a horizontal blanking of the display;
    a vertical resolution of the display;
    a vertical blanking of the display; and
    a refresh rate of the display.

9. The method of claim 7, wherein receiving frequency information associated with wireless transmissions of the information handling system comprises receiving frequency information from a basic input/output system (BIOS) of the information handling system.

* * * * *